United States Patent [19]
Ward, Jr. et al.

[11] Patent Number: 6,163,924
[45] Date of Patent: Dec. 26, 2000

[54] SWIVEL CASTER ASSEMBLY WITH RELEASABLE LOCK MECHANISM

[75] Inventors: William Ward, Jr., Uniontown; Scott Corley, Stow, both of Ohio

[73] Assignee: Graco Children's Products Inc., Elverson, Pa.

[21] Appl. No.: 08/862,278

[22] Filed: May 23, 1997

[51] Int. Cl.[7] .................................................. B60B 33/00
[52] U.S. Cl. ............................................................ 16/35 R
[58] Field of Search .............................................. 16/35 R

[56] References Cited

U.S. PATENT DOCUMENTS

| | | | |
|---|---|---|---|
| 2,068,160 | 1/1937 | Zeindler | 16/35 R |
| 2,081,594 | 5/1937 | McIntosh | 16/35 R |
| 3,479,681 | 11/1969 | Maslow | 16/35 R |
| 4,773,124 | 9/1988 | Nakao et al. | 16/35 R |
| 4,897,895 | 2/1990 | Wang | 16/20 |
| 5,237,721 | 8/1993 | Andrisin, III | 16/20 |
| 5,351,364 | 10/1994 | Zun | 16/35 R |
| 5,509,506 | 4/1996 | Jones | 16/35 R |

FOREIGN PATENT DOCUMENTS

| | | | |
|---|---|---|---|
| 2187946 | 9/1987 | United Kingdom | 16/35 R |

*Primary Examiner*—Chuck Y. Mah
*Assistant Examiner*—Donald M. Gurley
*Attorney, Agent, or Firm*—Foley & Lardner

[57] ABSTRACT

A swivel caster assembly is provided with a releasable locking mechanism which selectively locks the caster assembly against rotation. A leg bushing used to support the leg of an associated appliance such as a baby stroller is rotatably supported by a caster body. The caster body has an upwardly extending locking lug recess, a transverse access aperture passing through the recess, and a transverse axle aperture. A locking lug is slidably received within the recess, and is maneuvered to a fully extended locking position and a retracted unlocking position by an arm member pivotally secured to the caster body. Force transfer between the arm member and the lug is through a spring. A locking collar is secured to the leg bushing and has a downwardly opening notch for engaging the upper end of the locking lug when extended. A pair of detent bosses extend outwardly from the caster body and engage with detent apertures formed in the arm member.

8 Claims, 8 Drawing Sheets

SWIVEL CASTER ASSEMBLY WITH RELEASABLE LOCK MECHANISM

BACKGROUND OF THE INVENTION

This invention relates generally to caster wheel assemblies, and more particularly to an improved caster swivel assembly for rotationally mounting a support wheel to a frame of baby furniture such as a stroller and the like.

Baby furniture, particularly infant strollers, use caster wheel assemblies to provide directional maneuverability. A caster swivel connection for the wheels at the front of the stroller provides improved maneuverability and directional control for the users. In some cases, casters are used at each leg of the stroller. Due to the relatively light loads imparted on infant strollers, it is common to employ caster assemblies which use rotational bushings rather than bearing assemblies to reduce cost and weight while still providing smooth rotational movement. Conventionally, a single wheel or tandem wheel assembly is supported by an axle and retained by a swivel housing. A leg of the stroller frame is connected to a bushing which is rotationally disposed in the swivel housing. Various constructions are used to retain the bushing in the housing. U.S. Pat. No. 4,897,895, for example, discloses the use of a detent on a bushing to retain the bushing in the caster housing while allowing rotational movement. U.S. Pat. No. 5,237,721, the disclosure of which is hereby incorporated by reference, discloses a swivel caster assembly having a load bearing bushing rotationally disposed in the caster body having a wheel axle supporting aperture. Other constructions are known.

Known swivel caster assemblies of the type typically found in infant strollers afford excellent maneuverability on smooth support surfaces, such as ordinary sidewalks, driveways and the like. However, the normal free swiveling action of such caster assemblies is a disadvantage when the stroller encounters rough terrain, such as an earthen path with ruts, rocks or other obstructions. More particularly, because of the relative ease with which the support wheels can be swiveled in the caster assembly, the wheels tend to readily follow the irregular contours encountered which results, at best, in a rough and bumpy ride experienced by the infant in the stroller and, at worst, tipping or upsetting of the stroller itself. While the former reaction is merely discomforting to the infant, the latter can be dangerous. Attempts to minimize or eliminate the problem of erratic swiveling in rough terrain have included providing disengageable locking mechanisms which prevent rotation of the caster assembly. However, known solutions suffer from the disadvantages of relatively complicated structure, relatively high incremental cost and relative difficulty in use.

SUMMARY OF THE INVENTION

The invention comprises a swivel caster assembly having an actuatable swivel locking mechanism which is relatively inexpensive to implement in a swivel caster assembly, relatively simple in construction, effective in use and easy to engage and disengage.

The invention comprises a swivel caster assembly with a releasable locking mechanism, the assembly including a caster body having a first longitudinal bore for rotatably supporting a leg bushing, an upwardly opening locking lug recess, a first transverse aperture passing through the lug recess, and a transverse axle aperture for receiving a wheel axle. A leg bushing is rotatably received within the first longitudinal bore in the caster body and is provided in order to support a leg of an associated appliance, such as a baby stroller. A locking lug is slidably received in the locking lug recess, and a locking collar is secured to the leg bushing. The locking collar has a lug engaging portion, preferably a downwardly opening notch formed in a peripheral portion of the locking collar.

A lug operating member is pivotally attached to the caster body and movable between a locking position and an unlocking position. The lug operating member includes a lever portion for enabling a user to pivot the lug operating member between the locking position and the unlocking position, and a lug operating portion aligned with the first transverse aperture in the caster body. The lug operating portion includes an operating cross member passing through the first transverse aperture in the caster body and engagable with the locking lug to raise the locking lug to an extended locking position in which the locking lug is engaged with the locking collar and to retract the locking lug to a retracted unlocking position in which the locking lug is disengaged from the locking collar.

A spring is preferably positioned within the locking lug recess between a portion of the locking lug and the cross member to serve as a forced transfer spring between the lug operating portion of the lug operating member and the locking lug. Preferably, the locking lug has a hollow interior, and the spring is partially received within the hollow interior.

The locking lug preferably has a longitudinally extending aperture with a bottom edge for enabling the cross member to retract the locking lug by engagement therewith.

The lug operating member preferably includes a pair of arm portions flanking the caster body, each arm portion having a first end terminating at the lever portion and a second end including the lug operating portion.

The caster assembly preferably further includes means for providing a releasable detent between the lug operating member and the caster body in order to hold the lug operating member in one of the two positions in a releasable fashion. The detent providing means preferably comprises a pair of outwardly extending detent bosses formed in the caster body, and a pair of detent apertures formed in each of the arm portions of the lug operating member.

The invention provides a simple, economical and reliable releasable caster swivel locking mechanism for selectably preventing swiveling of the caster assembly.

For a fuller understanding of the nature and advantages of the invention, reference should be had to the ensuing detailed description taken in conjunction with the accompanying drawings.

DETAILED DESCRIPTION OF THE PREFERRED EMBODIMENT

Figure 1:
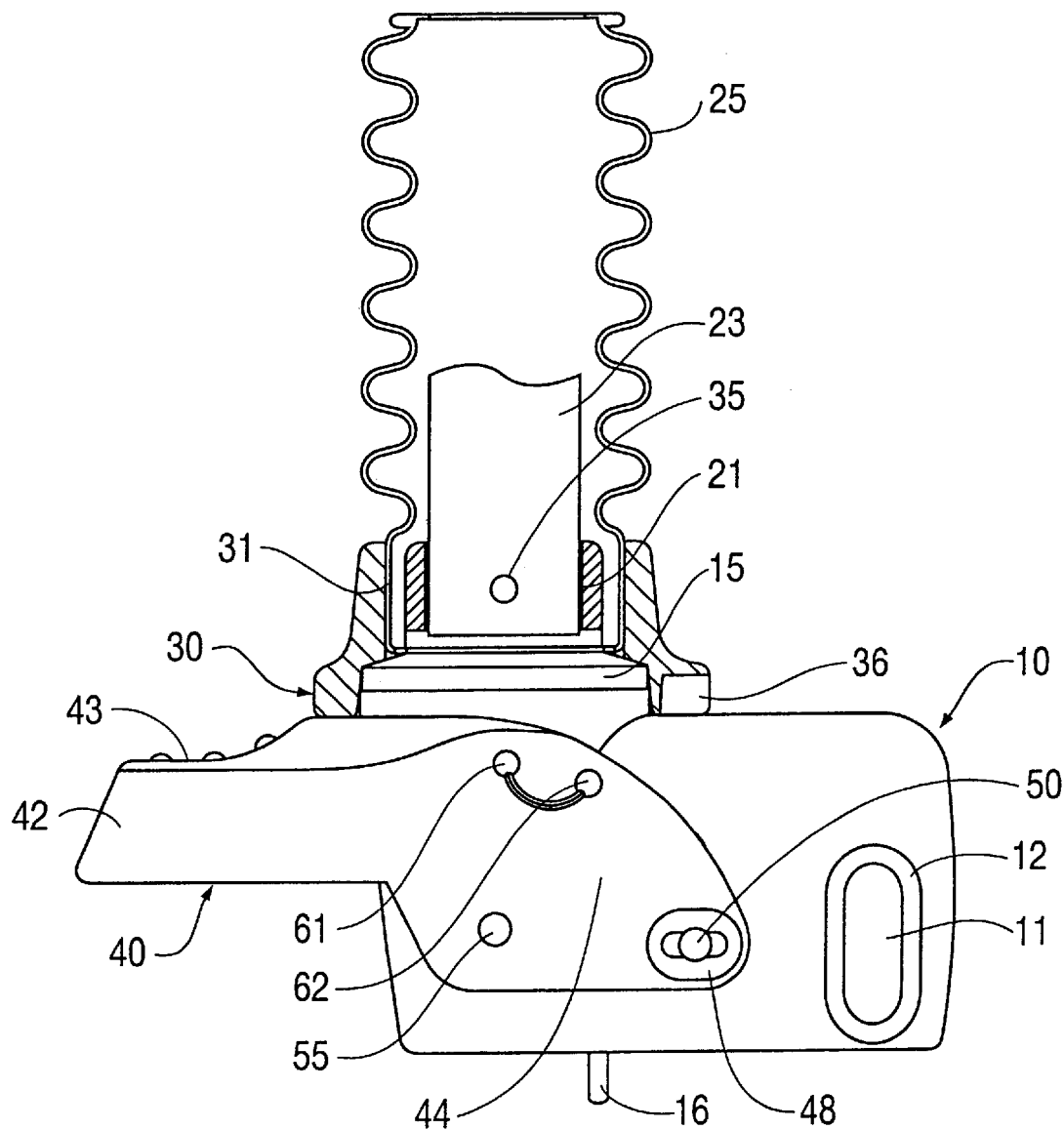
FIG. 1 is an elevational side view partially broken away of a preferred embodiment of the invention showing the assembly in the unlocked position.
Figure 2:
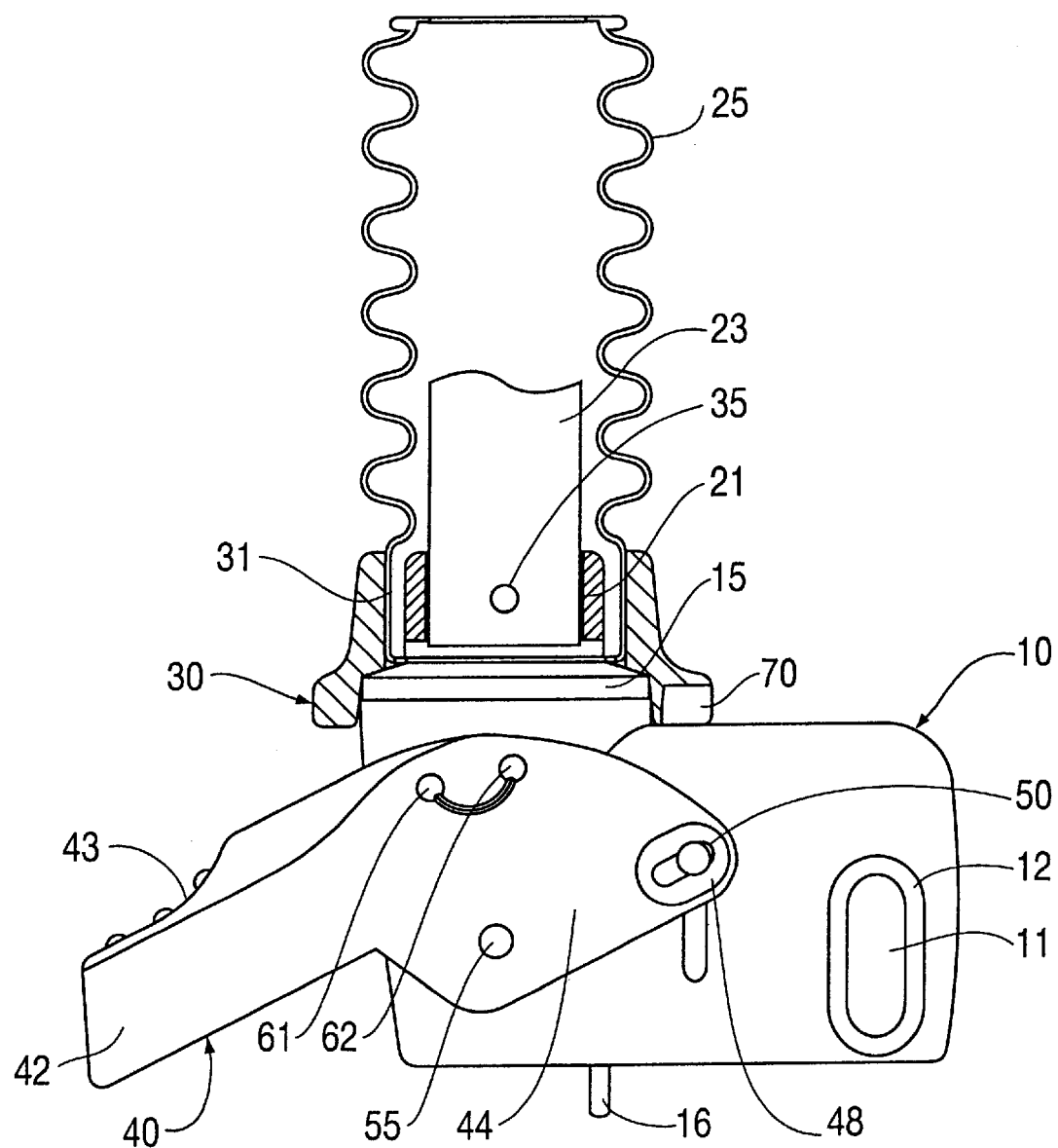
FIG. 2 is view similar to FIG. 1 showing the assembly in the locked position.
Figure 3:
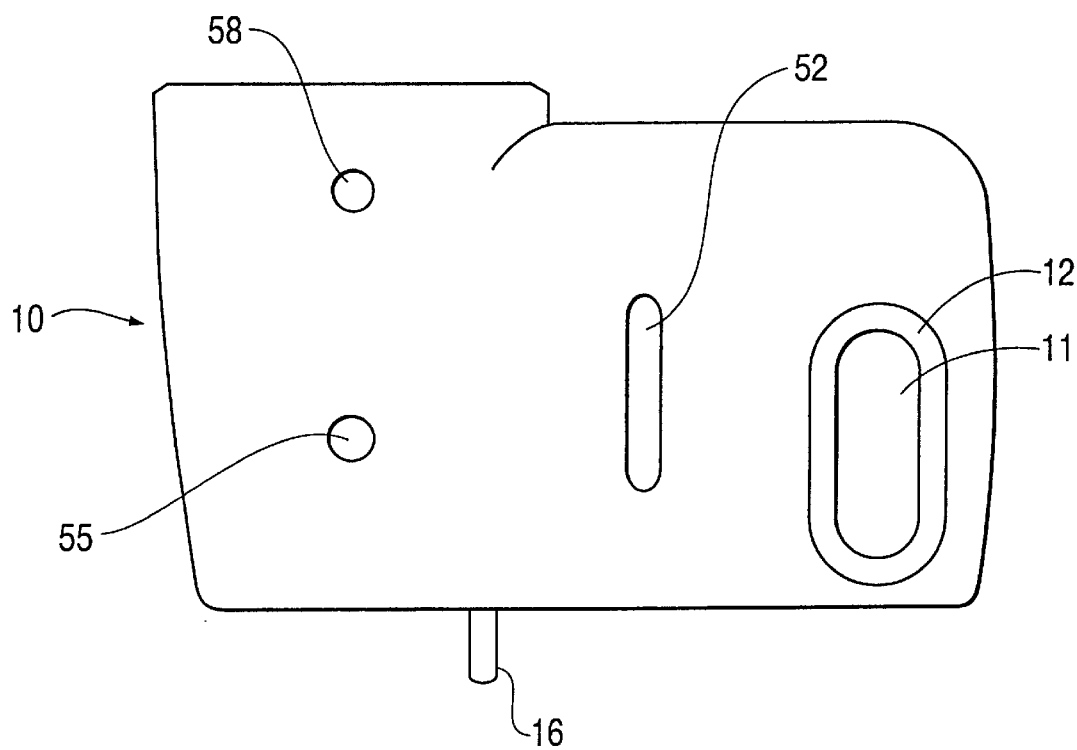
FIG. 3 is a side elevational view of the caster body.
Figure 4:
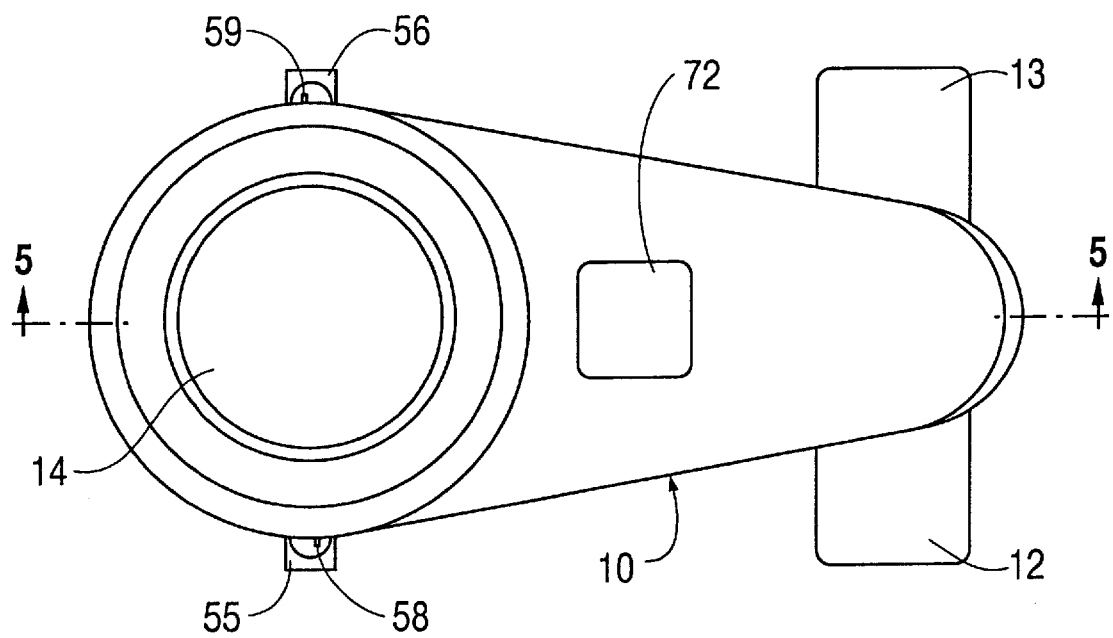
FIG. 4 is a top elevational view of the caster body.
Figure 5:
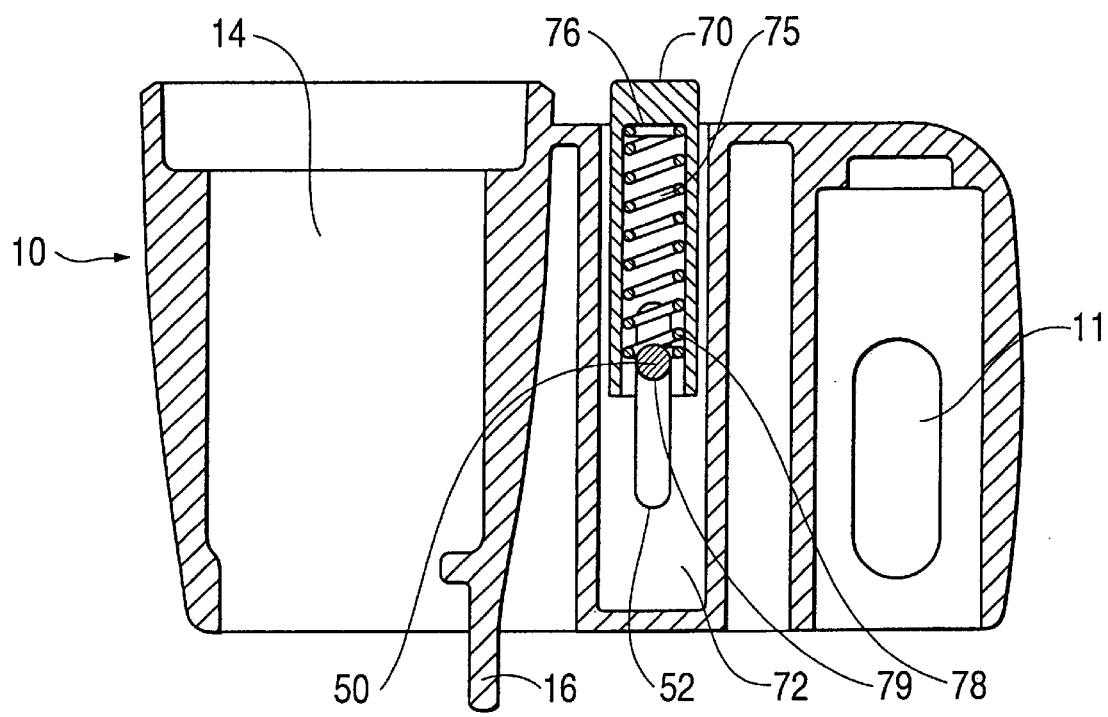
FIG. 5 is a sectional view taken along lines 5—5 of FIG. 4.
Figure 6:
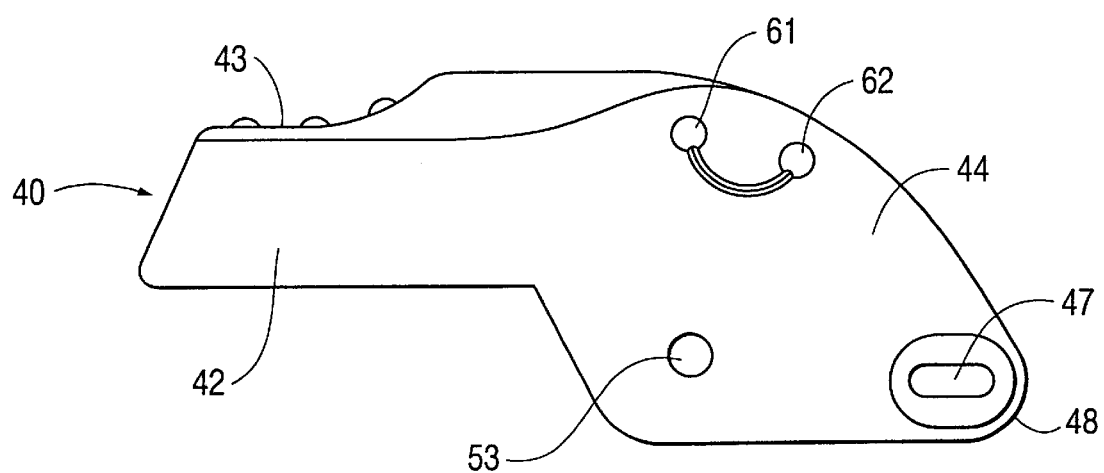
FIG. 6 is a side elevational view of the arm member.
Figure 7:
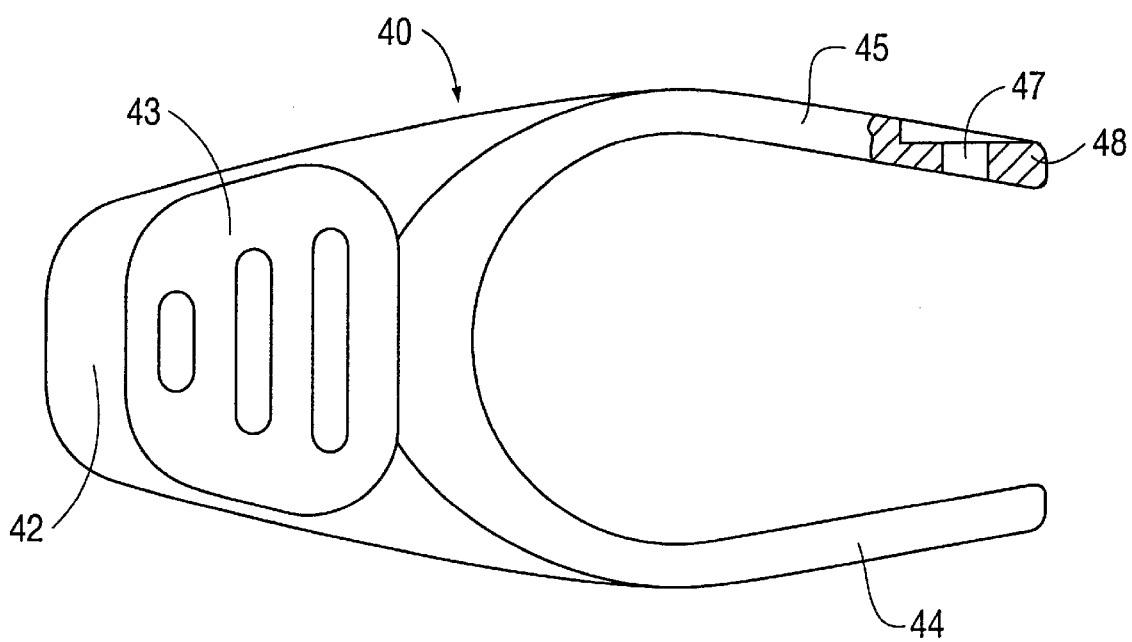
FIG. 7 is a top elevational view of the arm member.
Figure 8:
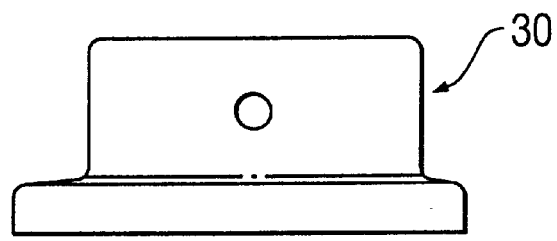
FIG. 8 is a side elevational view of the locking collar.
Figure 9:
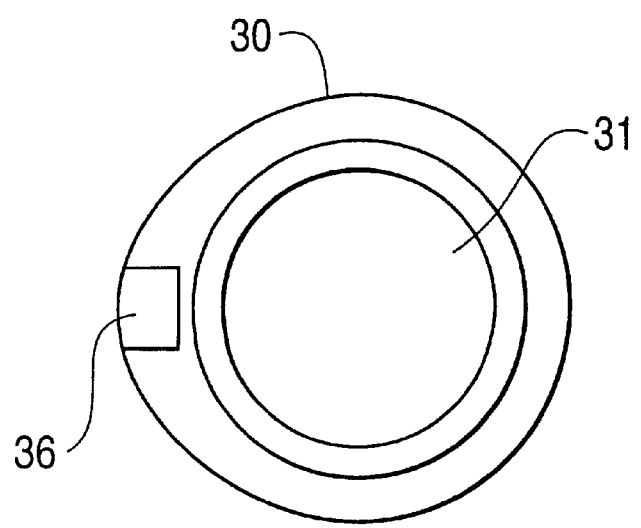
FIG. 9 is a bottom elevational view of the locking collar.

Turning now to the drawings, FIGS. 1–9 illustrate a preferred embodiment of the invention. As seen in these figures, a caster assembly includes a caster body generally designated with reference numeral 10 having an elongated through aperture 11 designed to receive an axle (not shown) to which one or more wheels are attached. In order to provide structural strength to support the axle, body 10 includes laterally extending support portions 12, 13. Body 10 is provided with a vertical through bore 14 adapted to rotationally receive a generally cylindrical bushing 15 which is releasably engaged in the bore 14 by means of a releasable lock tab 16. Bushing 15 has a central aperture 21 for receiving the lower end of a leg 23 of a baby stroller, baby furniture or the like. A flexible boot 25 is arranged about the outer circumference of bushing 15 and functions as a protective cover.

A generally oval locking collar 30 has a central through bore 31 sized to accommodate the lower end of boot 25 and the upper end of bushing 15. Collar 30, bushing 15 and leg 23 are pinned together by means of a suitable fastener 35, such as a pin, received through appropriate mutually aligned apertures formed in each of these elements. This fastening arrangement is substantially similar to that disclosed in the above referenced U.S. Pat. No. 5,237,721 for elements 24, 4 and 18 disclosed therein.

Locking collar 30 is provided with a peripheral notch 36 which opens downwardly in order to receive a retractable locking lug described below.

Pivotally attached to caster body 10 is a lock actuator member 40 having a laterally extending lever portion 42 provided with an upper contoured surface 43. Member 40 has a yoke-like structure with a pair of flanking arms 44, 45 each provided with an elongated aperture 47 at a nose portion 48 thereof. Apertures 47 are provided for receiving the ends of a transverse lug operating cross member 50 which passes through the interior of caster body 10 via a vertically oriented slot 52 formed in caster body 10. Arms 44, 45 are provided with a pivot aperture 53, each of which receives a pivot boss 55, 56 formed on the outer sidewall surfaces of caster body 10 and extending outwardly therefrom.

Also formed on the outer sidewalls of caster body 10 are a pair of arm detents 58, 59 which coact with detent apertures 61, 62 formed in each side arm portion 44, 45 of member 40. Detents 58, 59 serve to retain member 40 in one of two alternate positions: a first position in which collar 30 is locked against rotation, and a second position in which collar 30 is permitted to freely rotate about the vertical axis of caster body 10.

As noted above, collar 30 is provided with a downwardly facing lock notch 36. Lock notch 36 cooperates with a locking lug 70 in the following manner. Locking lug 70 is slidably received in an upwardly opening recess 72 formed in caster body 10. Lug 70 has a hollow interior for receiving a bias spring 75. Spring 75 is captured between the inner upper surface 76 of lug 70 and cross member 50 received in apertures 47 of arms 44, 45. Locking lug 70 has an elongated vertically arranged slot 78 with a bottom end 79.

In operation, with locking lug 70 in the retracted position, operation of lever portion 42 by pressing down on surface 43 causes member 40 to pivot about pivot bosses 55, 56. As member 40 begins to pivot, detent bosses 58, 59 are released from detent apertures 61 and glide along the inner surface of member 40 until member 40 reaches the locking position in which detent bosses 58, 59 are received in detent apertures 62. As member 40 rotates, cross member 50 bears on the bottom of bias spring 75 to urge locking lug 70 upwardly in recess 72. If locking collar 30 is in a rotational position in which lock notch 36 is correctly positioned over locking lug 70, the force of spring 75 will urge the top end of locking lug 70 into nesting engagement with lock notch 36. This nesting engagement provides rotation of locking collar 30 and bushing 15, thereby preventing rotation of caster body 10.

If locking collar 30 is not properly positioned when member 40 reaches to the locking position, the top surface of locking lug 70 engages the bottom surface of locking collar 30 after limited upward travel in response to upward movement of the bottom of spring 75. Further upward movement of the bottom of spring 75 merely serves to compress spring 75. As collar 30 rotates in response to rotational motion of caster body 10 about the axis of leg 23, eventually lock notch 36 will be rotated to the engagement position with the top of locking lug 70, and locking lug 70 will enter notch 36 under the upward force of compressed spring 75.

To release locking collar 30, member 40 is rotated in the unlocking direction (clockwise in FIG. 1). As arm member 40 pivots about bosses 55, 56, cross member 50 bears down on the lower edge 79 of slot 78 in locking lug 70, thereby pulling locking lug 70 downwardly into recess 72 in caster body 10 and freeing caster body 10 for rotational movement.

As will now be apparent, swivel caster assemblies provided with a releasable locking mechanism according to the invention are relatively simple in construction, reliable in operation and easy to maneuver between the locking position and the unlocking position. In addition, the swivel caster assembly according to the invention will reliably lock the caster body 10 against further rotation, regardless of the initial rotational position of the collar 30, due to the coaction of lock notch 36, spring 75 and locking lug 70. Consequently, when a stroller or other baby furniture provided with the invention is wheeled over rough terrain, the caster can be locked against swiveling in a reliable fashion by simply rotating member 40 to the locking position. This may be conveniently done by foot or by hand.

While the above provides a full and complete disclosure of the preferred embodiments of the invention, various modifications, alternate constructions and equivalents will occur to those skilled in the art. Therefore, the above should not be construed as limiting the invention, which is defined by the appended claims.

What is claimed is:

1. A swivel caster assembly with a releasable locking mechanism, said assembly comprising:

a caster body having a first longitudinal bore for rotatably supporting a leg bushing, an upwardly opening locking lug recess, a first transverse aperture passing through said lug recess, and a transverse axle aperture for receiving a wheel axle;

a leg bushing rotatably received in said first longitudinal bore for supporting a leg of an associated appliance;

a locking lug slidably received in said locking lug recess;

a locking collar secured to said bushing, said locking collar having a lug engaging portion; and a lug operating member including a pair of arm portions pivotally attached to and flanking said caster body and movable between a locking position and an unlocking position, said lug operating member including a lever portion for enabling a user to pivot said lug operating member between said locking position and said unlocking position, and a lug operating portion aligned with said first transverse aperture in said caster body such said arm portion having a first end terminating at said lever portion and a second end including said lug operating portion said lug operating portion including an operating cross member extending through said first transverse aperture for engagement with said locking lug to raise said locking lug to an extended locking position in which said locking lug engages said lug engaging portion of said locking collar and to retract said locking lug to a retracted unlocking position in which said locking lug is disengaged from said lug engaging portion of said locking collar.

2. The combination of claim 1 further including a spring positioned in said locking lug recess between a portion of said locking lug and said cross member to serve as a force transfer spring between said lug operating portion of said lug operating member and said locking lug.

3. The combination of claim 2 wherein said locking lug has a hollow interior; and wherein said spring is partially received within said hollow interior.

4. The combination of claim 2 wherein said locking lug has a longitudinally extending aperture with a bottom edge for enabling said cross member to retract said locking lug by engagement therewith.

5. The combination of claim 1 wherein said locking collar has a peripheral flange portion; and wherein said lug engaging portion comprises a downwardly opening notch formed in said peripheral flange portion.

6. The combination of claim 1 further including means for providing a releasable detent between said lug operating member and said caster body.

7. The combination of claim 6 wherein said means for providing a releasable detent includes a pair of detent bosses extending from said caster body and a plurality of detent apertures formed in said arm portions of said lug operating member.

8. The combination of claim 1 wherein said lever portion of said lug operating member includes a textured upper surface for facilitating operation of said lug operating member to the locking position.

* * * * *